United States Patent
Sinders

(10) Patent No.: US 6,796,461 B1
(45) Date of Patent: Sep. 28, 2004

(54) AIR OPERABLE PLURAL COMPONENT DISPENSING APPARATUS

(75) Inventor: Steven R. Sinders, Mooresville, IN (US)

(73) Assignee: Glas-Craft, Inc., Indianapolis, IN (US)

( * ) Notice: Subject to any disclaimer, the term of this patent is extended or adjusted under 35 U.S.C. 154(b) by 0 days.

(21) Appl. No.: 10/695,065

(22) Filed: Oct. 28, 2003

(51) Int. Cl.[7] ............................................... B67D 5/52
(52) U.S. Cl. ................................. 222/135; 222/145.5
(58) Field of Search ................................. 222/135, 136, 222/145.5, 334; 239/414

(56) References Cited

U.S. PATENT DOCUMENTS

| | | | |
|---|---|---|---|
| 3,799,403 A | | 3/1974 | Probst et al. ............... 222/135 |
| 4,838,458 A | * | 6/1989 | Davidson ................... 222/135 |
| 4,867,346 A | * | 9/1989 | Faye et al. ................ 222/145.2 |
| 5,027,975 A | * | 7/1991 | Keske et al. .................... 222/1 |

OTHER PUBLICATIONS

Glas–Craft brochure entitled "Probler Gun", Form GC–1043.

* cited by examiner

*Primary Examiner*—Philippe Derakshani
(74) *Attorney, Agent, or Firm*—Brinks Hofer Gilson & Lione

(57) ABSTRACT

In an air-operated plural component dispensing hand gun, including a sliding mixing and dispensing element that forms, with a pair of component inlet blocks, the valves controlling the mixing and dispensing of the plural component materials, the substantial friction imposed by metal seal elements that provide valve seals may be overcome by two serially connected pistons that operate along a common axis within two separate axially arranged cylinder portions to effect valve control of and mixing and dispensing of the plural component materials.

8 Claims, 3 Drawing Sheets

AIR OPERABLE PLURAL COMPONENT DISPENSING APPARATUS

FIELD OF THE INVENTION

The present invention relates to apparatus for dispensing materials, including, for example, an air-operable gun for dispensing thermoplastic and thermosetting plural component materials, such as urethane foams and coatings, catalyzed polyesters, catalyzed epoxies and other chemical compositions that react rapidly upon mixing of the components thereof.

BACKGROUND OF THE INVENTION

Polyurethane foam systems, for example, usually include component A, an isocyanate, and component B, a preformulated compound comprising a polyether resin, a catalyst, a surfactant and a blowing agent. Each component of the plural material is, by itself, generally stable, that is, each component does not cure or cross-link for several months or more, provided it is properly stored. However, mixing of component A and component B in proper concentrations initiates a chemical reaction that causes the components to begin to polymerize and generate heat which volatilizes the blowing agent and causes the polyurethane to foam, cure and cross-link. In one polyurethane system, water is used to combine with isocyanate to provide a carbon dioxide blowing agent; and in another polyurethane system, a fluorocarbon or freon, which boils at about room temperature, provides the blowing agent. In this system, the blowing agent is trapped in the resin and acts in cooperation with the other constituents of the system to foam the polyurethane. Other systems may be such that the blowing agent is used to provide a cellular structure.

Usually cross-linking and curing of a plural component material is substantially completed in a matter of seconds. It is therefore desirable to mix the components in the dispensing device as close as is possible to the orifice from which the mix is ejected, that is, mixing of the several components of the compound should take place substantially contemporaneously with dispensing. Mixing the components of the plural component material with the dispensing device requires the apparatus operator to purge the residue of the mixed components from a mixing chamber and the orifice of the dispensing device so that the residue components do not chemically react and clog the chamber and the orifice, or in any other way prevent or inhibit dispensing of the plural component material.

U.S. Pat. No. 3,799,403, issued to Richard O. Probst et al. discloses an apparatus for mixing and dispensing plural component materials, such as urethane foam materials. The Probst et al. patent discloses a hand gun which includes a mixing and dispensing element that is movable with respect to the housing of the device between a rearward position, at which the components of the plural component material are introduced into a mixing chamber in the mixing and dispensing element, appropriately mixed and then dispensed, and a forward position, at which the introduction of components into the mixing chamber is terminated, and air is introduced into the mixing chamber to substantially purge residue material from the mixing chamber and its cooperatively associated orifice.

In the gun disclosed by the Probst et al. patent, the movable mixing and dispensing element forms, in combination with a pair of connection blocks carried by the gun housing, the valves that control the mixing and dispensing of the plural component material. The connection blocks are connectible with the separate pressurized sources of the components of the plural component material and include outlet openings and carry plastic seal members around the outlet openings that interface with and seal against the sides of the mixing and dispensing orifice. The movable mixing and dispensing element includes an internal mixing chamber between its sides, a pair of admission openings, one between each side of the mixing and dispensing element and its internal mixing chamber, and a forward-most dispensing orifice connected with the mixing chamber. When the mixing and dispensing orifice is in its rearward position, the admission openings on each of its sides are aligned with the outlet openings of the connection blocks so the components of the plural component material can flow from their separate pressurized sources into the mixing chamber, where they are mixed and urged out of the dispensing orifice. When the mixing and dispensing element is in its forward position, the outlet openings of the connection blocks are blocked by the sides of the mixing and dispensing element, terminating the dispensation of mixed plural component materials. In the rearward position, the seals carried by the connection blocks confine the flows of the plural components to between the connection block-outlet openings and the admission openings of the mixing and dispensing element, and in the forward position, the seals prevent the plural components from flowing into the interface between the mixing and dispensing element and the connection blocks.

The housing of the device disclosed by the Probst et al. patent includes an air-operated piston/cylinder that is connected to the mixing and dispensing element to move it between its forward and rearward positions. A trigger on the handle of the hand gun controls the application of compressed air, through a four-way valve, to the portions of the cylinder on each side of a piston to move it forwardly and rearwardly within the cylinder, thus moving the mixing and dispensing element between its rearward mixing and dispensing position and its forward position at which the flow of plural component material is terminated and the mixing chamber is purged.

Plural component guns like those disclosed in the Probst et al. patent have been sold for almost 30 years by Glas-Craft, Inc., with the registered trademark PROBLER®. Such guns have required periodic replacement of the plastic seals that become worn through use as a result of the movement of the mixing and dispensing element against the seals, and it is desirable to reduce the intervals between seal replacement and apparatus down time. While it would be desirable to replace the plastic seals with metal seals to extend the seal life, the substantial increase in friction between the metal seals and the mixing and dispensing element could not be reliably overcome by an air operated piston/cylinder unit without unacceptably increasing the size and weight of the gun and reducing its maneuverability. In addition, in the event of a seal failure, or an improper seal replacement, or an improper attachment of connection blocks, or warped or damaged connection blocks, the plural components of the plural component material were sometimes urged by the pressure of their sources to flow into the piston/cylinder actuator where they reacted, terminating operation of the gun and requiring its disassembly and cleaning.

BRIEF SUMMARY OF THE INVENTION

The invention provides, for example, as an improvement of the PROBLER® gun, an air-operated, plural component dispensing hand gun with substantially improved reliability, reduced down time, and substantially reduced maintenance requirements without a significant increase in cost, size, weight or maneuverability of the gun.

A plural component hand gun of the invention comprises, for example, a housing, a pair of component connection blocks, each with a component outlet, carried by the housing, and a mixing and dispensing element, with admission openings for the plural components, carried by the housing between the connection blocks and forming, with the connection blocks, valves for controlling the flow of the components, a pair of metal seal elements carried at the component outlets between the connection blocks and the mixing and dispensing element, and an air-actuator for controlling the flow of plural component material from the hand gun comprising two serially connected pistons operating along a common axis within two separate cylinder portions of the housing, said serially connected pistons being connected with said mixing and dispensing element and driven in the same direction along a common axis of the two separate cylinder portions by the application of compressed air to the two separate cylinder portions A preferred apparatus of the invention can include, for example, a housing including a connection portion at its forward end and an actuator portion at its rearward end; a mixing and dispensing element formed with a planar portion on each of its sides, a mixing chamber within the element between the planar side portions of the element, a pair of admission openings, one admission opening extending between each of the planar sides of the element and the mixing chamber, and a dispensing orifice connected with the mixing chamber at the forward end of the mixing and dispensing element, said mixing and dispensing element being slidably carried by the connection portion of the housing; a pair of connection blocks for the plural components, one connection block being carried on each side of the connection portion of the housing with a side surface interfacing with a planar side portion of the mixing and dispensing element, each connection block providing means for connecting a supply of one of the plural components with the mixing chamber of the mixing and dispensing element and including an internal supply passageway leading to an outlet opening in its side surface, the side surface of each of said connection blocks carrying a seal element around its outlet opening that slidably engages the interfacing planar side portion of the mixing and dispensing element and seals the interface between the connection block and the mixing and dispensing element; and an air-operated actuator carried by the actuator portion of the housing for sliding the mixing and dispensing element with respect to the connection portion of the housing between a rearward position at which the admission openings of the mixing and dispensing element communicate with the outlet openings of the connection blocks, permitting a flow of the plural components into the mixing chamber for mixing and dispensation, and a forward position at which the outlet openings of the connection blocks are blocked by the planar side portions of the mixing and dispensing element, said air-operated actuator comprising a cylinder-forming wall within the actuator portion of the housing and a dual piston element slidably carried within the cylinder-forming wall and extending forwardly for connection with the mixing and dispensing element, said dual piston element comprising a forward piston and a rearward piston, each slidably sealed with the cylinder-forming wall, and a cylinder-dividing element slidably carried by a connecting rod extending between the forward and rearward pistons, said cylinder-dividing element being sealed with and held stationary within the cylinder-forming wall of the actuator portion of the housing, whereby the actuator portion of the housing is provided with a first piston/cylinder portion with the forward piston being drivable therein and a second piston/cylinder portion with the rearward piston being drivable therein, the driving forces of said forward piston and rearward piston being combined in sliding the mixing and dispensing element between its forward and rearward positions.

Embodiments of the invention can further comprise means for connecting a compressed air inlet in the housing with a source of compressed air, comprising a first opening in communication with air passageways leading to the two separate cylinder portions of the actuator portion of the housing, a second opening in communication with an air passageway leading to an air chamber formed so as to be adjacent the admission openings of the mixing and dispensing element in its forward non-dispensing position, and a ball check valve between the first and second openings which is opened in the presence of compressed air at the first opening and closed in the absence of compressed air at the first opening, thereby preventing plural component material from flowing back into the first opening and the air passageways leading to the air-operated actuator and its operating valve.

The drawings and more detailed description of the preferred embodiment that follow comprises one example of the invention. Other embodiments of the invention will be apparent to those skilled in the art from the drawings and more detailed description that follows.

BRIEF DESCRIPTIONS OF THE DRAWINGS

Figure 1:
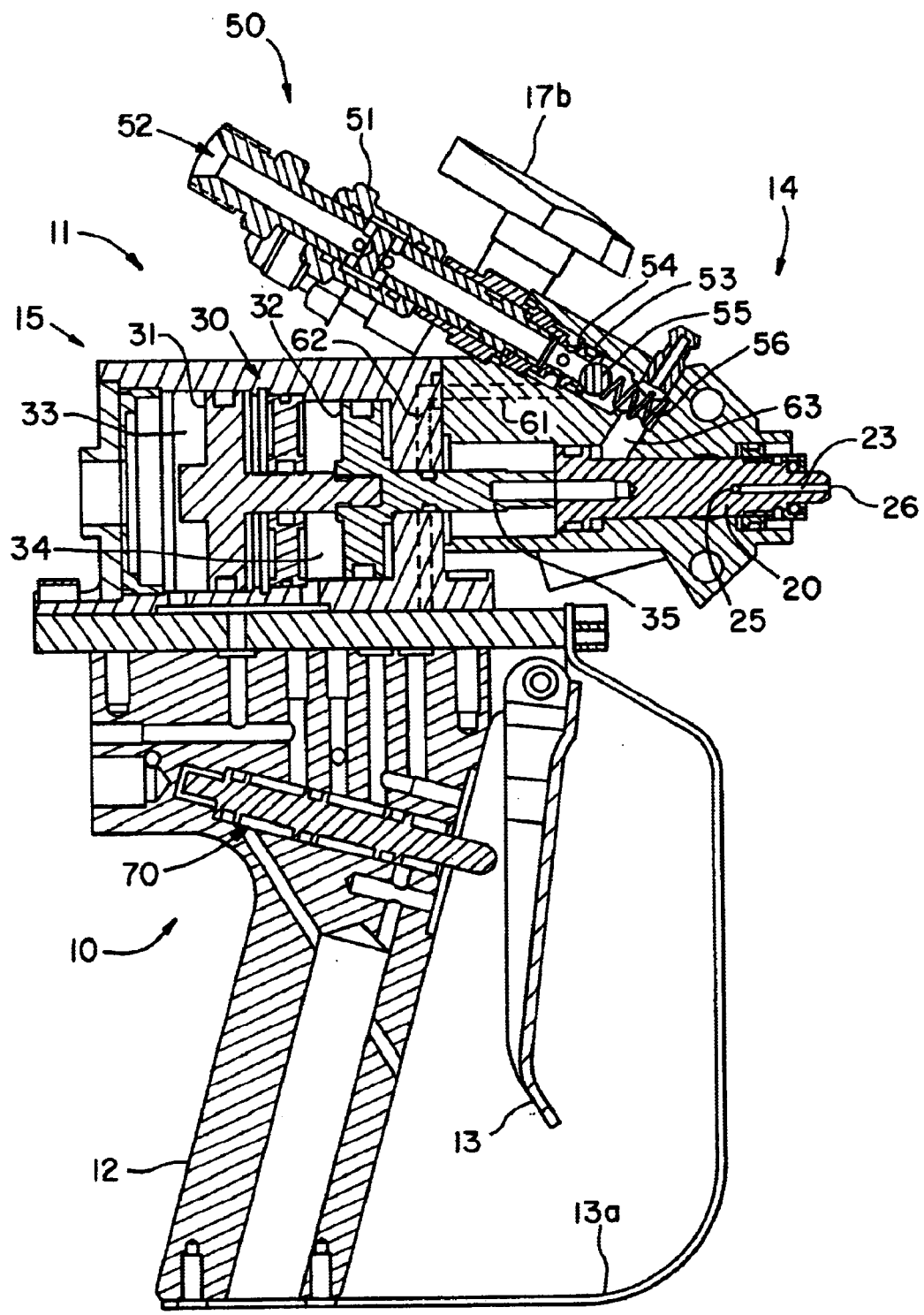
FIG. 1 is a cross-sectional view of a plural component hand gun of the invention, taken at the vertical plane and in the direction indicated by line 1—1 of FIG. 2, in the non-dispensing position.
Figure 2:
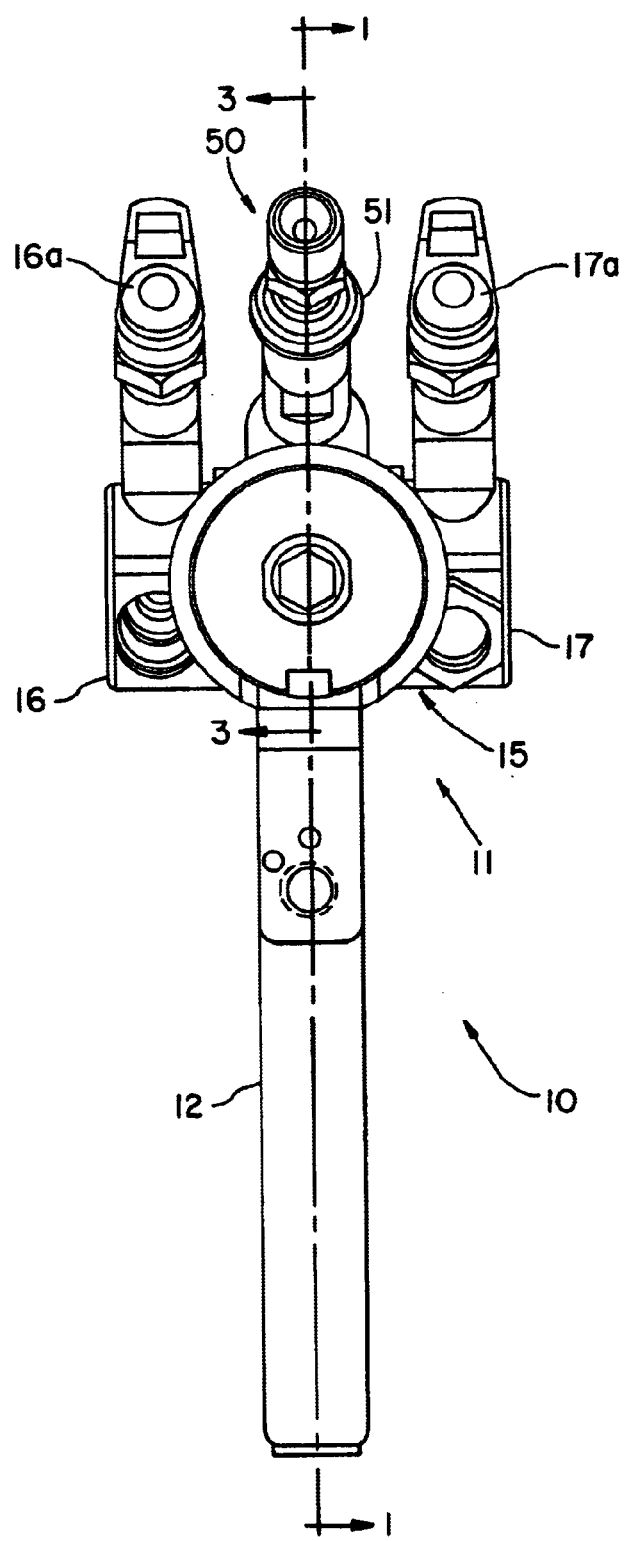
FIG. 2 is a view of the plural component hand gun of FIG. 1, taken from the rear.
Figure 3:
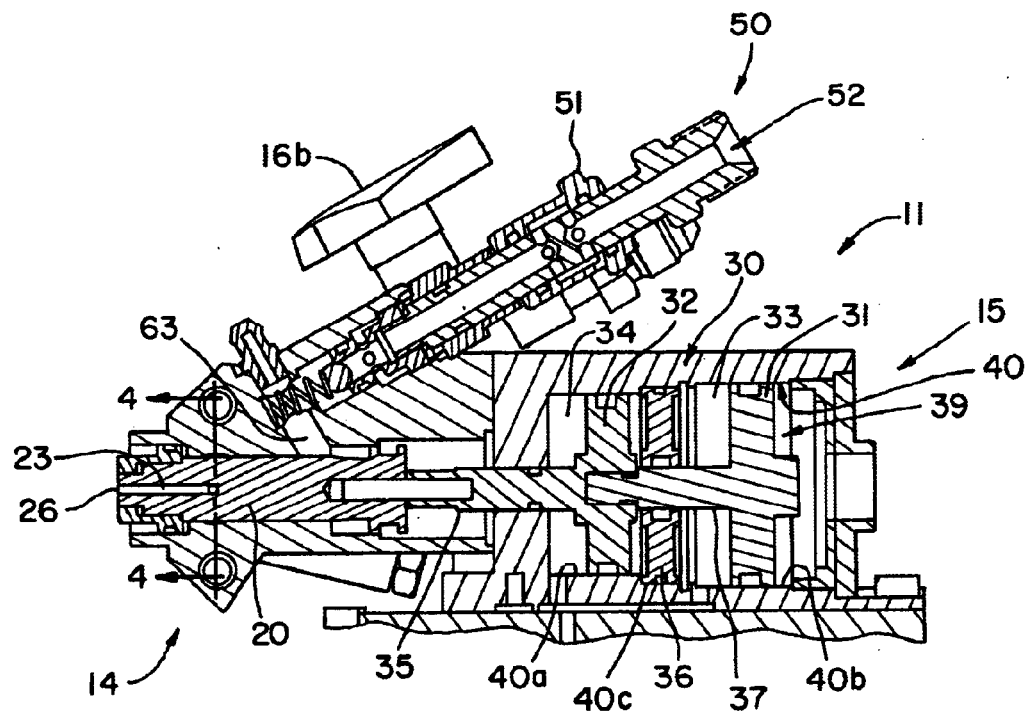
Figure 4:
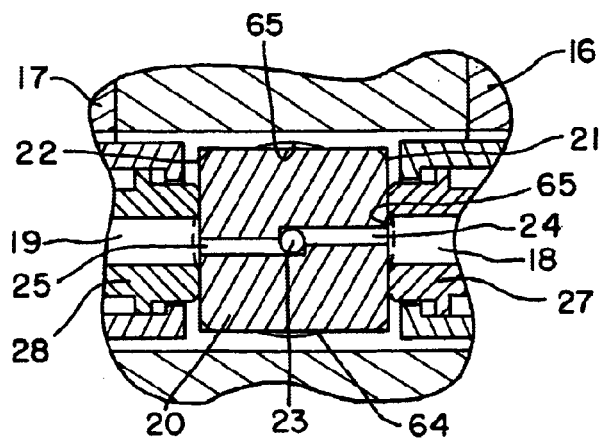

FIG. 3 is a partial cross-sectional view of the plural component hand gun of FIGS. 1 and 2, taken at the vertical plane and in the direction indicated by line 3—3 of FIG. 2, to illustrate the mixing and dispensing element and its air-operated actuator in the dispensing position; and FIG. 4 is an enlarged partial cross-sectional view of FIG. 3 taken at the vertical plane and in the direction indicated by line 4—4 of FIG. 3 to illustrate the sealed interface between the mixing and dispensing element and its connection blocks in the mixing and dispensing position.

DETAILED DESCRIPTION OF THE CURRENTLY BEST KNOWN MODE OF THE INVENTION

FIGS. 1–4 exemplify one preferred plural component dispensing hand gun 10 of the invention. As indicated by FIG. 1, the plural component dispensing hand gun 10 includes a housing 11, a handle 12 extending from the housing at an angle, and a trigger 13 pivotally carried by the handle 12. The hand gun 10 may be conveniently provided with a trigger guard 13a. The housing 11 includes a connection portion 14 at its forward end and an actuator portion 15 at its rearward end. The words "forward" and "forwardly" in this description refer to the direction in which mixed plural component material is dispensed, and the terms "rearward" and "rearwardly" refer to the direction toward the back of the gun, which is illustrated in FIG. 2.

The connection portion of the housing 14 carries a pair of connection blocks 16 and 17 (see FIG. 2). The connection blocks 16 and 17 provide connections for hoses that lead from the apparatus 10 to pressurized sources of each of the components of the plural component material. For example, connection block 16 carries a hose connection 16a for a flexible hose leading to a source of component A of a plural component material, and connection block 17 carries a hose connection 17a for a flexible hose leading to a source of component B of the plural component material. The connection blocks 16 and 17 can also carry valves 16b and 17b to block the flow of the plural components to the outlets 18, 19 (FIG. 4) of the connection blocks. The connection blocks 16 and 17 thus provide the inlets for each of the components of the plural component material to the hand gun 10, and are also sometimes referred to in this description as inlet blocks 16 and 17.

In the hand gun 10, the hose connections 16a and 17a project upwardly and rearwardly from the connection blocks 16 and 17 so the hoses supplying the plural components from the respective separate sources of supply will be conveniently carried by the hand gun 10 over the handle 12. The hand gun 10 is likewise connected with a source of compressed air by an air inlet means 50 of the invention, described in greater detail below. As illustrated by FIGS. 1 and 3, the air inlet means 50 also projects upwardly and rearwardly from the connection portion 14 of the housing so that an air hose connected thereto will be conveniently carried over the handle 12 of the gun. The air inlet means 50 can include a sliding on/off valve 51 so that the hand gun operator can remove air pressure from the gun when it is not in operation. With valve 51 turned off, the gun 10 cannot be operated. The on/off valve can also be used to control the flow of compressed air used to purge the mixing chamber 23 when the gun is in the non-dispensing position.

As best illustrated in FIG. 1, the connector portion 14 of the housing slidably carries a mixing and dispensing element 20, and the actuator portion 15 of the housing 11 carries air actuator 30 to move the mixing and dispensing element 20 forwardly and rearwardly within the connection portion 14 of the housing.

As illustrated best by FIG. 4, the mixing and dispensing element 20 is formed with a pair of planar sides 21 and 22, an internal mixing chamber 23 located between the planar sides 21 and 22, and a pair of admission openings 24 and 25, with admission opening 24 extending between planar sidewall 21 and the mixing chamber 23, and with admission opening 25 extending between planar sidewall 22 and the mixing chamber 23. As best illustrated in FIG. 1, the mixing chamber 23 extends forwardly through the mixing and dispensing element 20 from the admission openings 24, 25 to a dispensing orifice 26. Again, as illustrated by FIG. 4, the connection or inlet blocks 16 or 17 include outlet openings 18 and 19, respectively, that are at the terminal ends of liquid passageways extending through the connection or inlet blocks 16 or 17, respectively, from their respective hose connections 16a and 17a. A pair of seal elements 27, 28 are carried by the connection blocks 16 and 17 around their outlet openings 18 and 19, respectively, to seal the interfaces between the planar sides 21 and 22 of the mixing and dispensing element 20 and the adjoining side surfaces of the connection/inlet blocks 16 and 17.

As illustrated by FIGS. 3 and 4, when the air actuator 30 moves the mixing and dispensing element 20 rearwardly, it comes to rest in a dispensing position in which the admission openings 24, 25 of the mixing and dispensing element 20 are aligned with the outlets 18, 19 of the connection blocks 16, 17, and the pressurized sources of the components of the plural component material can urge the components of the plural component material, which are connected to the hose connections 16a and 17a, through the admission openings 24 and 25 into the mixing chamber 23 for mixing and dispensation from the dispensing orifice 26 of the mixing and dispensing element 20. When the air actuator 30 moves the mixing and dispensing element 20 forwardly within the connection portion 14 of the housing 11, the admission openings 24, 25 of the mixing and dispensing element 20 are moved out of alignment with the outlet openings 18, 19 of the connection blocks 16, 17, and the planar sides 21, 22 of the mixing and dispensing element 20 block the outlet openings 18, 19, which are sealed shut by the planar sides 21, 22 of the mixing and dispensing element 20 and the seal elements 27, 28. Thus, the mixing and dispensing element 20 not only provides a means for mixing and dispensing plural component materials, it also provides a valve means for controlling their flow from the hand gun 10.

Compressed air delivered to the gun through the air inlet means 50 is put into a plurality of uses in the gun 10. When the valve 51 is in the "on" position, compressed air applied to the inlet end 52 of the air inlet means 50 is present at a first opening 53 downstream of the on/off valve 51, and can flow through air passageways 61 and 62 formed respectively in the connection portion 14 and actuator portion 15 of the housing 11 for connection with air passageways in the handle 12, and for control by a four-way valve 70, which is operated by the trigger 13 pivotally connected with the handle. When the trigger 13 is in the unpulled position, the chambers of the four-way valve 70 connect compressed air from passageway 62 to the air actuator 30 to force the mixing and dispensing element 20 forwardly to the non-dispensing position illustrated in FIG. 1, and when the trigger is pulled rearwardly by an apparatus operator, the chambers of the four-way valve apply compressed air to the air actuator 30 to move the mixing and dispensing element 20 to its rearward dispensing position illustrated in FIGS. 3 and 4. The passageways leading from the four-way valve through the handle 12 and the actuator portion 15 of the housing to the air actuator 30 are not shown but will be apparent to those skilled in the art from the description of the air actuator.

The use of metal seal elements 27, 28, preferably hardened stainless steel, greatly reduces the wear on the seal elements, the possibility of a seal failure, and substantially increases the time between replacement of the seal elements, reducing the maintenance costs of the hand gun 10. Unfortunately, the use of metal seal elements 27, 28 substantially increases the force needed to slide the mixing and dispensing element 20 between its dispensing and non-dispensing positions. The use of metal seals almost doubles the force needed to slide the mixing and dispensing element 20 between its dispensing and non-dispensing positions in operation of the hand gun, and would, unfortunately require the actuator portion of the housing to almost double in size in order for the pressure of compressed air that is usually available in a manufacturing operation to develop sufficient force to reliably move the mixing and dispensing element 20 between its dispensing and non-dispensing positions. Such an increase in size and the accompanying increase in weight would undesirably reduce the maneuverability of the hand gun and result in increased fatigue of hand gun operators.

As illustrated by FIGS. 1–3, the hand gun 10 of the invention does not include an actuator portion of the housing having increased size and weight, because in the invention, the air actuator comprises to serially connected pistons 31, 32 operating along a common axis within two separate cylinder portions 33, 34 of the housing 11. The serially connected pistons 31, 32 are connected to the mixing and dispensing element 20 by a rod 35, extending forwardly through the actuator portion 15 of the housing with which it is sealed. In the operation of the hand gun 10, the two serially connected pistons 31, 32 are driven in the same direction along a common axis by the application of compressed air to the two separate cylinder portions 33, 34, as a result of the operation of trigger 13 and four-way valve 70. When the trigger 13 is in the unpulled position, the four-way valve 70 applies compressed air within the two separate cylinder portions 33, 34 rearwardly of the pistons 31, 32, moving the mixing and dispensing element 20 to its non-dispensing position illustrated in FIG. 1. When the trigger 13 is pulled, it moves the four-way valve 70 to a position in which compressed air is applied to the two separate cylinder portions 33, 34 forwardly of the pistons 31, 32 to move the pistons 31,32 rearwardly within their separate cylinder portions 33, 34, and to move the mixing and dispensing element 20 rearwardly to its dispensing position, as illustrated in FIGS. 3 and 4. Thus, in the invention, the force generated by the air actuator and applied to the mixing and dispensing element 20 can be substantially doubled by the forces exerted on the two serially connected pistons by the compressed air, thus obviating the need to increase the size and weight of the hand gun 10 to overcome the substantial friction imposed on the gun by the metal seals 27, 28.

In the preferred embodiment of the hand gun 10, illustrated in the figures, and particularly in FIG. 4, the actuator portion 15 is provided with a cylinder-forming wall 40 that has a smaller diameter forward portion 40a, and a larger diameter rearward portion 40b. As indicated in FIG. 3, a dual piston element 39 is slidably carried within the cylinder-forming walls 40a and 40b, and extends forwardly through rod 35 for connection with the mixing and dispensing element 20. The dual piston element comprises an assembly including a forward piston 32 and a rearward piston 31, which may be slidably sealed with the smaller diameter forward portion 40a,and the larger diameter rearward portion 40b, respectively of the cylinder-forming wall, and a cylinder-dividing element 36 is slidably carried by a connecting rod 37 extending between the forward and rearward pistons 32 and 31. With the dual piston element 39 in place within the cylinder-forming walls 40a and 40b, the cylinder-dividing element 36 is sealed with the larger diameter portion 40b of the cylinder-forming wall, and is seated and held stationary at the wall 40c formed by the transition between the smaller diameter portion 40a and larger diameter portion 40b of the cylinder-forming wall 40. As a result, the actuator portion 15 and the cavity formed by the cylinder-forming wall 40 is divided into the first cylinder portion 34 with the forward piston 32 being drivable therein, and a second cylinder portion 33 with the rearward piston 31 being drivable therein, and the driving forces generated on the pistons 31, 32 by the compressed air are added in sliding the mixing and dispensing element 20 between its forward and rearward positions. For example, in a preferred hand gun of the invention, the smaller diameter cylinder 40a has a diameter of 1⅜ inches, and a larger diameter cylinder 40b has a diameter of 1½ inches, providing a combined area upon which compressed air acts equal to almost 3¼ square inches, permitting factory air to exert several hundred pounds of force to move the mixing and dispensing element 20 between its dispensing and non-dispensing positions.

As noted earlier, compressed air admitted to the inlet end of 52 of the air inlet means 50 is put to a plurality of uses in the gun. In addition to operation of the two serially connected pistons 31, 32, as a result of operation of the trigger 13 and the four-way valve 70, compressed air is also directed from the air inlet means 50 through passageways including passageway 63, formed in the connection portion 14 of the housing 11, to an air chamber 64 (shown in FIG. 4) formed by a cylindrical cavity portion 65 within the actuator portion 14 of the housing I 1 in communication with the sides 21, 22 of the mixing and dispensing element 20, which has a square cross-section in the preferred embodiment. When the mixing and dispensing element 20 is in its forward non-dispensing position, the admission openings 24, 25 of the mixing and dispensing element 20 are moved from within seal elements 27, 28 and are located within the air chamber 64 so that compressed air applied to the air chamber 64 will be forced through the admission openings 24, 25, the mixing chamber 23, and the dispensing orifice 26, expelling residue of the plural component material therefrom so it does not cure and prevent or inhibit further operation of the gun 10. The flow of purging air through passageway 63, the air chamber 64 formed in connection portion 14 of the housing, the admission openings 24, 25 and the mixing chamber 23 and dispensing orifice 26 may be controlled by adjustment of the on/off valve 51, or other valve between the end of the air inlet means 50 and passageway 63.

As shown in FIGS. 1 and 3, the air inlet means 50 is threadedly connected to an air inlet passage 54, formed in the connection portion 14 of the housing 11. The air inlet 54 and the connection portion 14 of the housing carry a ball check valve formed by a ball 55 and a spring 56 that urges the ball 55 into a sealing position against the end of the air inlet means 50 if compressed air is not present at the first opening 53 of the air inlet means 50. The ball check valve formed by ball 55, spring 56 and the end of the air inlet means 50 is in the closed position when compressed air is not present at the first orifice 53, and thus prevents plural component material from flowing backwardly through the passageway 63 into the passageways 61, 62 and into the four-way valve 70 and air actuator 30 in the event the seals 27, 28 between the mixing and dispensing element 20 and the connection blocks 16 and 17 fail, or in the event the connection blocks 16 and 17 are not properly seated or have become defective.

As known in the art, the components of the gun 10 are fabricated from any suitable wear-resistant material that is chemically inert with respect to the components of plural component materials being dispensed. Suitable materials include aluminum, aluminum alloys, steel, and strong, durable plastics, such as acetyl resin, glass-filled epoxy, glass-filled nylon and the like, the preferable materials being light-weight metals, such as aluminum.

Thus, preferred embodiments of the invention can include air inlet means 50 for connecting a source of compressed air with compressed air inlet 54 that is formed in the connection portion 14 of the housing 11, and the compressed air inlet means can comprise a manually operated off/on valve 51 between the source of compressed air and the compressed air inlet 54, a first opening 53 in communication with air passageways 61, 62 leading to a four-way valve 70 and an air actuator 30, and a second opening 56 in communication with an air chamber formed in the connection portion 14 of the housing for the passage of compressed air to expel mixed plural component material residue from the mixing chamber 23 of the mixing and dispensing element 20. In the air inlet means 50, a ball check valve is provided between the first and second openings 53, 56, which is opened in the presence of compressed air at the first opening 53, and closed in the absence of compressed air at the first opening 53, thereby preventing plural component air from flowing back into the first opening 53 and the air passageways 61, 62 leading to the four-way valve 70 and the air operated actuators 30.

The foregoing detailed description and the drawings should be regarded as illustrative rather than limiting, and it should be understood that it is the following claims, including all equivalents, that are intended to define the spirit and scope of this invention.

What is claimed is:

1. Apparatus for mixing the plural components of a plural component material and dispensing the mixed plural component material, comprising a housing including a connection portion at its forward end and an actuator portion at its rearward end;

a mixing and dispensing element formed with opposed planar side portions, a mixing chamber within the element between the planar side portions, a pair of admission openings, one admission opening extending between each of the planar side portions and the mixing chamber, and a dispensing orifice in communication with the mixing chamber at the forward end of the mixing and dispensing element, said mixing and dispensing element being slidably carried by the connection portion of the housing;

a connection block for each of the plural components carried by the connection portion of the housing, one connection block being carried on each side of the connection portion of the housing with a side surface interfacing with a planar side portion of the mixing and dispensing element, each connection block providing means for connecting a supply of one of the plural components with the mixing chamber of the mixing and dispensing element and including an internal supply passageway leading to an outlet opening in its side surface, the side surface of each of said connection blocks carrying a seal element around its outlet opening that slidably engages the interfacing planar side portion of the mixing and dispensing element and seals the interface between the connection block and the mixing and dispensing element;

an air-operated actuator carried by the actuator portion of the housing for sliding the mixing and dispensing element with respect to the connection portion of the housing between a rearward position at which the admission openings of the mixing and dispensing element communicate with the outlet openings of the connection blocks, permitting a flow of the plural components into the mixing chamber for mixing and dispensation, and a forward position at which the outlet openings of the connection blocks are blocked by the planar side portions of the mixing and dispensing element, said air-operated actuator comprising a cylinder-forming wall in the actuator portion of the housing and a dual piston element slidably carried within the cylinder-forming wall and extending forwardly for connection with the mixing and dispensing element, said dual piston element comprising a forward piston and a rearward piston slidably sealed with the cylinder-forming wall and a cylinder-dividing element slidably carried by a connecting rod extending between the forward and rearward pistons, said cylinder-dividing element being sealed with and held stationary within the cylinder-forming wall of the actuator portion of the housing, whereby the actuator portion of the housing is provided with a first piston/cylinder portion with the forward piston being drivable therein and a second piston/cylinder portion with the rearward piston being drivable therein, the driving forces of said forward piston and rearward piston being combined in sliding the mixing and dispensing element between its forward and rearward positions.

2. The apparatus of claim 1 wherein the cylinder-forming wall includes a forward portion with a smaller diameter and a rearward portion with a larger diameter and a transverse wall therebetween, and the cylinder-dividing element is seated against the transverse wall and held stationary.

3. The apparatus of claim 1 wherein a handle with a trigger is connected to the housing and includes a trigger-operated four-way air valve for operation of the air-operated actuator, said trigger being urged to an unpulled position by a spring; wherein the housing includes a compressed air inlet and air passageways leading from the compressed air inlet to the four-way valve and to an air chamber adjacent the admission openings of the mixing and dispensing element in its forward position; wherein when the trigger is pulled, compressed air is directed by the four-way valve and the air passageways of the housing into the first and second piston/cylinder portions of the housing forwardly of the forward and rearward pistons, respectively, driving the mixing and dispensing element to its rearward position, dispensing mixed plural component material; and wherein when the trigger is released and urged to its unpulled position by the spring, compressed air is directed by the four-way valve and the air passageways of the housing into the first and second piston/cylinder portions of the housing rearward of the forward and rearward pistons, respectively, driving the mixing and dispensing element to its forward position, blocking the flows of the plural component material into the mixing chamber, and positioning the admission openings of the mixing and dispensing element in the air chamber and expelling mixed plural component material residue from the mixing chamber and dispensing orifice of the mixing and dispensing element.

4. The apparatus of claim 3 further comprising means for connecting a compressed air inlet formed in the housing with a source of compressed air, comprising a manually operated on/off valve between the source of compressed air and the compressed air inlet, a first opening in communication with the air passageways in the housing leading to the four-way valve, a second opening in communication with the air passageway leading to the air chamber, and a ball check valve between the first and second openings which is open in the presence of compressed air at the first opening and closed in the absence of compressed air at the first opening, thereby preventing plural component material from flowing back into the first opening and the air passageways leading to the four-way valve and air-operated actuator.

5. In an apparatus for mixing the components of a plural component material and dispensing mixed plural component material, comprising a hand gun including means, carried by a hand gun housing, for the controlled mixing and dispensation of the plural component material, said means including a mixing chamber, a dispensing orifice in communication with the mixing chamber and a valve for controlling the flows of the components of the plural component material into the mixing chamber, and a trigger-operated air actuator for said valve, the improvement wherein said air actuator comprises two serially-connected pistons operating along a common axis within two separate cylinder portions of the hand gun housing, said two separate cylinder portions being connectable with a source of compressed air to drive said serially-connected pistons in the same direction by the application of compressed air to the two separate cylinder portions controlled with said trigger.

6. The apparatus of claim 5 wherein the two separate cylinder portions are formed within a common cylindrical cavity of said hand gun housing by a cylinder-dividing member slidably carried on a connecting rod extending between the two serially-connected pistons.

7. The apparatus of claim 5 further comprising a compressed air inlet formed in the housing, and means for connecting the compressed air inlet formed in the housing with a source of compressed air, comprising a first opening in communication with air passageways in the housing leading to the valve and two separate cylinder portions, a second opening in communication with an air chamber in communication with the mixing chamber, and a ball check valve between the first and second openings which is open in the presence of compressed air at the first opening and closed in the absence of compressed air at the first opening, thereby preventing plural component material from flowing back into the first opening and the air passageways leading to the valve and two separate cylinder portions.

8. An apparatus for mixing and dispensing plural component materials, comprising a housing including a connection portion, an actuator portion and a compressed air inlet;

means for the controlled mixing and dispensation of a plural component material carried by the connection portion of said housing, said means including a mixing chamber, a dispensing orifice in communication with the mixing chamber and a valve for controlling the flows of the components of the plural component material to the mixing chamber, an air-operated actuator for said valve carried by the actuator portion of said housing, said air-operated actuator comprising two serially connected pistons operating along a common axis within two separate cylinder portions of a common cylindrical cavity formed in the actuator portion of said housing, said housing including air passageways leading from the compressed air inlet to the two separate cylinder portions of the housing, with two air passageways leading to each of the two separate cylinder portions, one passageway of each pair leading to each of the opposite sides of the piston in each separate cylinder portion;

an air valve between the compressed air inlet and the air passageways for the controlled application of compressed air to the two separate cylinder portions, said air valve controlling the application of compressed air to the two separate cylinder portions to drive the two serially connected pistons in the same direction along their common axis to provide the flows of the plural components into the mixing chamber when the two serially connected pistons are driven in one direction and to block the flows of the plural components to the mixing chamber when the two serially connected pistons are driven in the other direction; and means for connecting the compressed air inlet to a source of compressed air comprising a first opening in communication with the air passageways for the controlled application of compressed air to the two separate cylinder portions, a second opening in communication with means in the connection portion of the housing for directing a flow of compressed air through the mixing chamber and dispensing orifice when the flows of the plural components are being blocked, and a check valve between the first and second openings, said check valve being open when compressed air is applied to the first opening and closed in the absence of compressed air at the first opening.

* * * * *